July 4, 1939.   J. SENFT   2,165,114
ANTISKID CROSS CHAIN
Filed Sept. 3, 1938   2 Sheets-Sheet 1
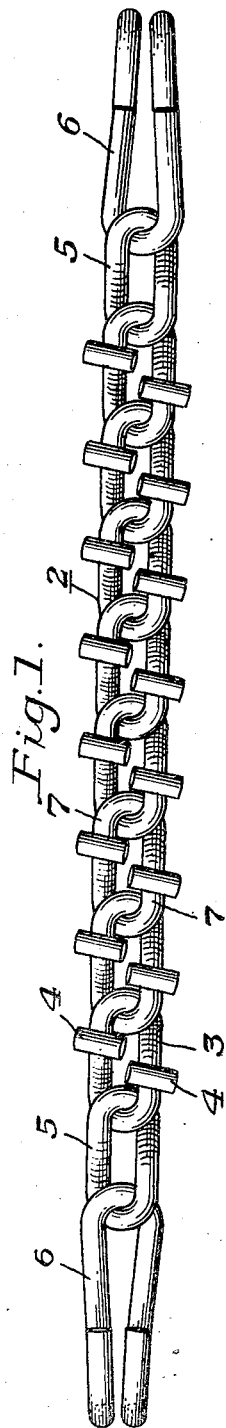
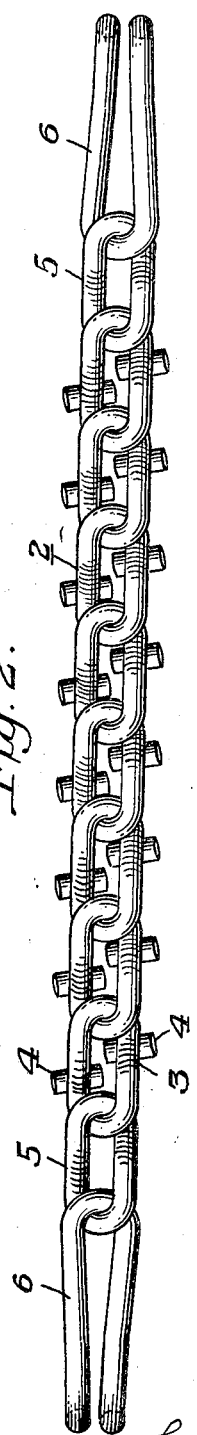
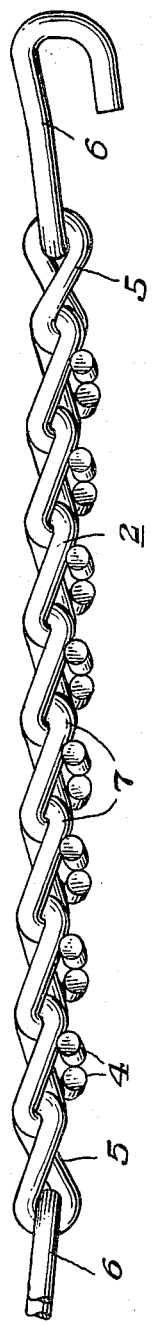
INVENTOR
John Senft July 4, 1939.  J. SENFT  2,165,114
ANTISKID CROSS CHAIN
Filed Sept. 3, 1938  2 Sheets-Sheet 2

INVENTOR
John Senft

Patented July 4, 1939

2,165,114

UNITED STATES PATENT OFFICE 2,165,114

ANTISKID CROSS CHAIN

John Senft, York, Pa., assignor to The McKay Company, Pittsburgh, Pa., a corporation of Pennsylvania Application September 3, 1938, Serial No. 228,407

4 Claims. (Cl. 152—243)

This invention relates to anti-skid cross chains such as are commonly used on the wheels of automotive vehicles to afford increased traction and reduce the likelihood of skidding on slippery roadways. The invention relates more specifically to anti-skid cross chains of the type employing calks which are united with the links of the cross chain and which, when the cross chain is in use, contact the roadway. I have found that by a particular arrangement of the calks on the links the traction of the wheels to which the cross chains are applied is greatly increased and the likelihood of skidding greatly diminished.

Anti-skid cross chains having calks welded to the links of the chains are well known in the art. Calks have heretofore been applied to the links of cross chains in various ways and with different theories of action in view. While in some applications the calks have proved decidedly beneficial, in other applications they have been of little or no benefit. I have discovered a particular arrangement of the calks on the links of the cross chain which brings about a more positive and reliable gripping action on the surface of the roadway. My improved cross chain makes for more positive stopping on a slippery roadway without excessive longitudinal or transverse skidding and also enables more rapid acceleration in starting. The calks are so positioned on the links of the cross chain as to exert a maximum tractive effect without unnecessarily impairing the riding quality of the vehicle.

I preferably employ the usual twisted links each having its ends disposed at an angle to each other so that the interconnected links can all lie in substantially the same relationship with respect to the surface of the tire or wheel to which the cross chain is applied. The calks are preferably of rod shape and two calks are preferably united with each link at the portion of the cross chain which engages the roadway surface in use. Each link at such portion of the cross chain preferably has a rod-shaped calk united therewith at each of two points on opposite sides of the link at the face of the link remote from the wheel to which the cross chain is applied and which points are offset from each other longitudinally of the link. In a preferred form of structure I unite a rod-shaped calk with each link of the cross chain adapted to contact the roadway surface in use in the vicinity of each of the two generally diagonally opposed points thereof most remote from the wheel to which the cross chain is applied. When twisted links as above mentioned are employed the calks are preferably united therewith in the vicinity of their protuberant bends. The calks preferably extend generally transversely of the cross chain and are so positioned thereon that when the cross chain is laid down on a plane surface and disposed with its axis substantially in a straight line and with the calks in contact with such surface the respective lines of calks at the edges of the cross chain have their axes disposed respectively in planes approximately parallel to said plane surface but intersecting each other at an angle somewhat less than a straight angle. In my preferred structure the planes containing the axes of the respective lines of calks intersect each other at an upwardly diverging angle somewhat less than a straight angle. This feature, as will be hereinafter more fully explained, contributes largely to the efficiency of my improved cross chain.

The calks of each link are preferably diagonally disposed with respect to the longitudinal center line of the link and with the inward extremity of each calk nearer the transverse center line of the link than its outward extremity and having their most adjacent points spaced apart a distance less than the smallest transverse dimension of the stock of which the links are made. I also prefer to unite each calk to its link in the vicinity of the mid point of the calk so that the inner ends of the calks at both edges of the cross chain lie substantially in the same line longitudinally of the cross chain and the outer ends of the calks project a substantial distance laterally outwardly from their respective links.

Other details, objects and advantages of the invention will become apparent as the following description of a present preferred embodiment thereof proceeds.

In the accompanying drawings I have shown a present preferred embodiment of the invention, in which Figure 1 is a face view of a cross chain disposed with its axis substantially in a straight line and with the links in substantially uniform relation to one another as though the cross chain were laid down on a plane surface, the chain being viewed from the face thereof at which the calks are applied;

Figure 2 is a face view of the cross chain disposed as shown in Figure 1 but viewed from the opposite face;

Figure 3 is a side view or elevation of the cross chain disposed as shown in Figures 1 and 2 but viewed at right angles to both of said figures;

Figure 4:
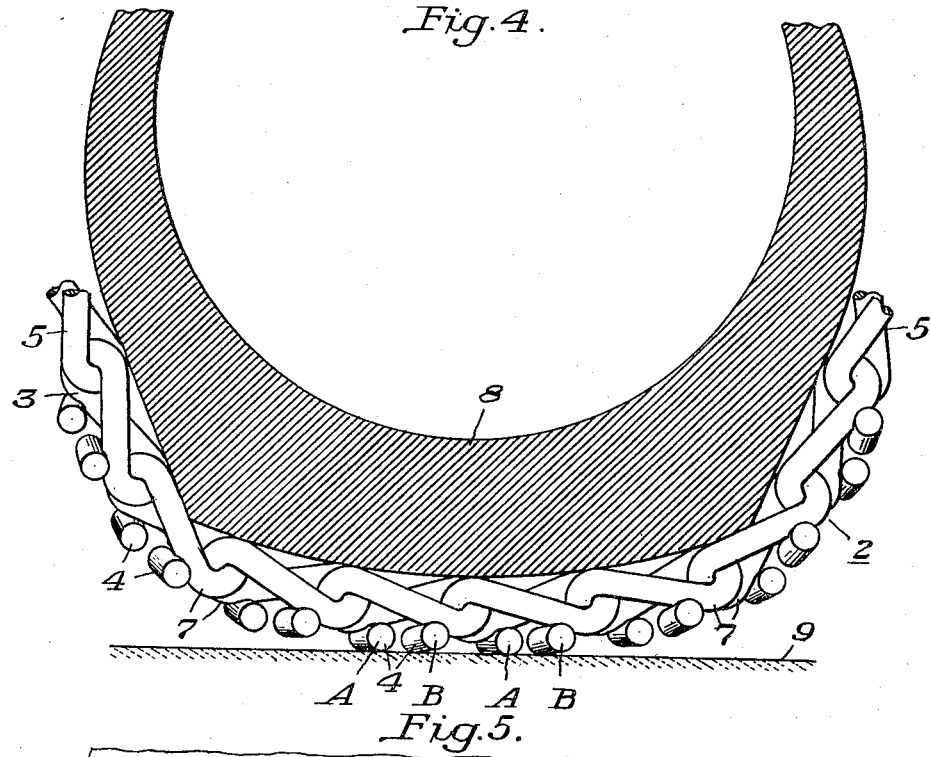
Figure 4 is a more or less diagrammatic view showing a portion of the cross chain in elevation as applied to a vehicle tire.

Referring now more particularly to the drawings, there is shown in each of Figures 1 and 2 a complete cross chain designated generally by reference numeral 2 and which is made up of eight links 3 each having calks 4 united therewith, two plain links 5, and two hooks 6. The cross chain is adapted to be connected at each end with circumferential side chains by means of the hooks 6 in well known manner, or the cross chain may be applied individually by connecting together the two hooks 6 by connecting means extending between spokes of the wheel, or the cross chain may be otherwise connected with the wheel so as to extend transversely of the wheel or tire so as to serve as an anti-skid tread therefor.

Figure 5:
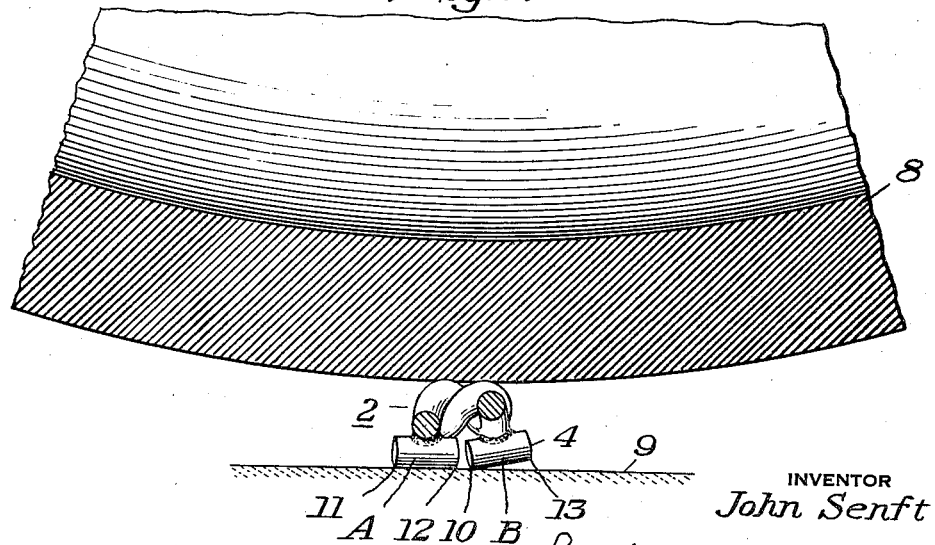
Figure 5 is a transverse cross-sectional view through the tire and cross chain taken at right angles to Figure 4.

In the structure shown in the drawings all of the links 3 and 5 are of uniform construction except that the links 3 have the calks 4 applied to them. Each of the links is somewhat elongated generally in the direction of the length of the cross chain and is twisted so that its ends where the link is interconnected with adjacent links are disposed at an angle of approximately 90° to each other. This arrangement enables the use of identical interconnected links which all lie in the same position relative to each other and to the supporting surface when the cross chain is laid down on a plane surface and disposed with its axis substantially in a straight line as shown in Figures 1 to 3, inclusive. When the cross chain is applied to a wheel the relationship between the links and the supporting surface is altered only in that the supporting surface is curved as shown in Figures 4 and 5 rather than plane, the links still lying in approximately uniform relationship with respect to each other and with respect to the supporting surface.

When a chain made up of twisted links as above described is laid down on a plane surface in such a position that when the chain is viewed in a direction substantially at right angles to such surface one can look through the openings in the links, as shown in Figures 1 and 2, each link has at each of the upper and lower faces thereof two opposed protuberant bends, one at one side of the link near one end thereof and the other at the opposite side of the link near the opposite end thereof. These protuberant bends are the portions of the links which when the cross chain is applied to a wheel lie in engagement with the wheel or tire at one face of the cross chain and are most remote from the wheel or tire at the opposite face of the cross chain. The protuberant bends which are most remote from the wheel or tire are the portions of the links which, if not protected, would engage the surface of the roadway when the cross chain is in use on a wheel. It is these outside protuberant bends rather than those which lie against the wheel or tire that are designated by the expression "outside protuberant bends" in the claims and hereafter in the specification. The outside protuberant bends of the links 3 are designated by the reference numeral 7 in Figures 1, 3 and 4.

The calks 4 are rod-shaped as shown and have substantially straight axes and although they are shown as being of circular cross section they may be of any suitable cross section. The calks which are attached to opposite sides of a chain link extend generally transversely of the chain but have their axes offset from each other, as shown in Figure 1. The calks are shown as having a length of approximately three times the diameter thereof. For standard automobile cross chains the links and calks may both conveniently be made of round steel rod stock of about 3/16" diameter, such a cross chain being illustrated in the drawings. Two calks are united with each of the links 3, preferably by welding in well known manner. A calk is united with each link 3 in the vicinity of each outside protuberant bend thereof, as shown in Figures 1, 3 and 4. In the form shown the calks are not connected with the links at the highest point of each outside protuberant bend but are spaced slightly toward the transverse center line of the link from such highest point. However, considering the thickness of the calks, the thickness of the stock of which the links are made and the degree of twisting of the links, the calks as I apply them will when the cross chain is in use engage the surface of the roadway as shown in Figures 4 and 5.

The calks extend generally transversely of the cross chain and are shown as inclined relatively to the length of the cross chain at an angle of approximately 80°. All of the calks are preferably inclined in the same direction, as shown, and each calk is united to its link in the vicinity of the mid point of the calk so that the inner ends of the calks at both edges of the cross chain lie substantially in the same line longitudinally of the cross chain and the outer ends of the calks project a substantial distance laterally outwardly from their respective links. The most adjacent points of the two calks of each link are preferably spaced apart a distance less than the smallest transverse dimension of the stock of which the links are made, whereby to prevent any portion of any link from passing between the calks of an adjacent link when the chain is not in use and thereby tangling the chain and rendering it relatively difficult to straighten out and apply.

The calks are so positioned on the links 3 that when the cross chain is laid down on a plane surface and disposed with its axis substantially in a straight line and with the calks in contact with such surface the respective lines of calks at the edges of the cross chain have their axes disposed respectively in planes approximately parallel to said plane surface but intersecting each other at an angle somewhat less than a straight angle, which angle in the preferred form shown in the drawings diverges upwardly or away from the surface in contact with which the calks lie.

Referring now to Figures 4 and 5 of the drawings, there is illustrated purely diagrammatically at 8 a portion of a tire to which the cross chain 2 is applied. The tire may be of conventional form and the cross chain may be applied thereto in any well known manner such as above referred to. When the cross chain is applied to the tire the outside protuberant bends 7 of the links of the cross chain in the vicinity of which the rod-shaped calks 4 are welded to the links are disposed away from the tire and the calks engage the roadway surface when the cross chain is in use. In describing the operation of the cross chain in use the vehicle carrying the tire will be considered as rolling outwardly, or toward the viewer, from the plane of the paper in Figure 4 and as rolling toward the right in Figure 5. The line or row of calks which is in advanced position on the wheel as the wheel rolls relatively to the roadway surface will strike the roadway surface first. The calks of this row or line are marked A in Figures 4 and 5, while the calks of the trailing row as the wheel moves relatively to the roadway surface are marked B. The roadway surface is designated 9 in Figures 4 and 5. While the calks of only the two center links of the cross chain are shown in Figure 4 as engaging the roadway surface, the calks of other of the links may engage the roadway surface under varying conditions of loading and of the roadway surface.

If the vehicle carrying the tire 8 shown in Figures 4 and 5 be considered as starting up or accelerating, the calks A which first engage the roadway surface as the vehicle advances will assume positions as shown in Figures 4 and 5 in which they lie substantially flat against the roadway surface. The axes of the calks A and B of the respective links lie, as above stated, in planes intersecting each other at an upwardly diverging angle somewhat less than a straight angle. In the structure shown in the drawings this angle is approximately 170°, although satisfactory results can be obtained if the angle varies between about 160° and about 175°. When the calks A lie flat against the roadway surface the sharp inner lower edge 10 of each of the calks B is positioned so as to tend to dig into the roadway surface, as most clearly shown in Figure 5, and, as the calks A and B of each link are offset from each other longitudinally of the cross chain, each of the links in engagement with the roadway surface tends to adjust itself so that the weight with which the tire presses the link against the roadway surface is divided between the two calks A and B of the link. Then as the vehicle accelerates, the edges 10 of the respective calks B engage the roadway surface and tend to prevent the wheel from spinning and afford greater tractive effort. The outer lower edges 11 of the calks A which lie flat against the roadway surface also tend to dig into the roadway surface, but the weight is not so concentrated as is the case with the inclined calks B where the entire weight exerted through each calk is concentrated at the edge 10.

When the forwardly moving vehicle is being decelerated by application of the brakes the calks A will first lie flat against the roadway surface, as shown in Figures 4 and 5, and then as the vehicle advances the calks B will assume a position flat against the roadway surface analogous to the position in which the calks A are shown in the drawings. When the calks B lie flat against the roadway surface the sharp inner lower edge 12 of each of the then inclined calks A is positioned so as to tend to dig into the roadway surface. The outer lower edges 13 of the then horizontal calks B which are in engagement with the roadway surface also tend to dig into the roadway surface, but, as described above, the weight of the vehicle transmitted through a link to the roadway surface is divided between the two calks of the link and in the case of the inclined calk is concentrated at the inner lower edge thereof. Thus as the vehicle decelerates the sharp forwardly facing edges of the calks tend to dig into the roadway surface and prevent skidding.

While I have shown and described a present preferred embodiment of the invention, it is to be distinctly understood that the invention is not limited thereto but may be otherwise variously embodied within the scope of the following claims.

I claim:

1. An anti-skid cross chain comprising interconnected twisted links having rod-shaped calks united therewith on opposite sides of a link at the face of the link remote from the wheel to which the cross chain is applied and at points which are offset from each other longitudinally of the link, the calks extending generally transversely of the cross chain but having their axes offset from each other and being so positioned thereon that when the cross chain is laid down on a plane surface and disposed with its axis substantially in a straight line and with the surface the respective calks in contact with such surface the respective lines of calks at the edges of the cross chain have their axes disposed respectively in planes approximately parallel to said plane surface but intersecting each other at an angle of at least about 160° and less than 180°.

2. An anti-skid cross chain comprising interconnected twisted links having rod-shaped calks united therewith in the vicinity of their outside protuberant bends, the calks extending generally transversely of the cross chain but having their axes offset from each other and being so positioned thereon that when the cross chain is laid down on a plane surface and disposed with its axis substantially in a straight line and with the calks in contact with such surface the respective lines of calks at the edges of the cross chain have their axes disposed respectively in planes approximately parallel to said plane surface but intersecting each other at an upwardly diverging angle of at least about 160° and less than 180°.

3. An anti-skid cross chain comprising interconnected twisted links having rod-shaped calks united therewith in the vicinity of their outside protuberant bends, the calks of each link having their axes offset from each other and being diagonally disposed with respect to the longitudinal center line of the link and with the inward extremity of each calk nearer the transverse center line of the link than its outward extremity and having their most adjacent points spaced apart a distance less than the smallest transverse dimension of the stock of which the links are made, the calks being so positioned that when the cross chain is laid down on a plane surface and disposed with its axis substantially in a straight line and with the calks in contact with such surface the respective lines of calks at the edges of the cross chain have their axes disposed respectively in planes approximately parallel to said plane surface but intersecting each other at an upwardly diverging angle of at least about 160° and less than 180°.

4. An anti-skid cross chain comprising interconnected twisted links having rod-shaped calks united therewith in the vicinity of their outside protuberant bends, the calks extending generally transversely of the cross chain but having their axes offset from each other and each being united to its link in the vicinity of the mid point of the calk so that the inner ends of the calks at both edges of the cross chain lie substantially in the same line longitudinally of the cross chain and the outer ends of the calks project a substantial distance laterally outwardly from their respective links, the calks being so positioned that when the cross chain is laid down on a plane surface and disposed with its axis substantially in a straight line and with the calks in contact with such surface the respective lines of calks at the edges of the cross chain have their axes disposed respectively in planes approximately parallel to said plane surface but intersecting each other at an upwardly diverging angle of at least about 160° and less than 180°.

JOHN SENFT.